United States Patent
Hu et al.

(10) Patent No.: US 8,838,535 B2
(45) Date of Patent: Sep. 16, 2014

(54) PROVIDING SERVICES ACROSS SYSTEMS THAT MANAGE DISTRIBUTED REPLICAS

(71) Applicant: Oracle International Corporation, Redwood Shores, CA (US)

(72) Inventors: Wei-Ming Hu, Palo Alto, CA (US); Lakshminaray Chidambaran, Sunnyvale, CA (US); Mark Dilman, Sunnyvale, CA (US); Feroz A. Khan, Bangalore (IN); Bhaskar Mathur, Bangalore (IN); Kevin S. Neel, San Mateo, CA (US); Leonid Novak, Redwood City, CA (US); Kant C. Patel, Fremont, CA (US); Saravanakumar Ramasubramanian, Bangalore (IN); Michael J. Stewart, San Francisco, CA (US); Hubert Sun, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/645,819

(22) Filed: Oct. 5, 2012

(65) Prior Publication Data
US 2014/0101100 A1   Apr. 10, 2014

(51) Int. Cl.
*G06F 17/30* (2006.01)
(52) U.S. Cl.
USPC ............................. 707/617; 707/635; 707/636
(58) Field of Classification Search
None
See application file for complete search history.

(56) References Cited

U.S. PATENT DOCUMENTS

| | | | | |
|---|---|---|---|---|
| 7,702,676 | B2 * | 4/2010 | Brown et al. | 707/713 |
| 7,805,407 | B1 * | 9/2010 | Verbeke et al. | 707/634 |
| 7,809,690 | B2 * | 10/2010 | Pommerenk et al. | 707/674 |
| 8,065,284 | B2 * | 11/2011 | Kaplan | 707/705 |
| 8,117,488 | B2 * | 2/2012 | Chan et al. | 714/4.3 |
| 8,271,468 | B1 * | 9/2012 | Peddy et al. | 707/705 |
| 8,527,473 | B1 * | 9/2013 | Brown et al. | 707/682 |
| 8,540,556 | B2 * | 9/2013 | Hiddink et al. | 452/179 |
| 2004/0243647 | A1 * | 12/2004 | Oheda | 707/200 |
| 2004/0249788 | A1 * | 12/2004 | Dant | 707/1 |
| 2006/0064478 | A1 | 3/2006 | Sirkin | |
| 2008/0162583 | A1 * | 7/2008 | Brown et al. | 707/200 |
| 2009/0182718 | A1 * | 7/2009 | Waclawik et al. | 707/3 |
| 2012/0166483 | A1 * | 6/2012 | Choudhary et al. | 707/770 |
| 2012/0173774 | A1 * | 7/2012 | Lee et al. | 710/39 |

* cited by examiner

*Primary Examiner* — Debbie Le
(74) *Attorney, Agent, or Firm* — Hickman Palermo Truong Becker Bingham Wong LLP

(57) ABSTRACT

Techniques are provided to allow users to define a global service that is offered across multiple replicated databases. Database clients connect to and use a global service just as they do with regular services on a single database today. Upon receiving a connection request, a collection of components, referred to collectively as the Global Data Service framework (GDS framework), automatically chooses the best database server instances to which to connect a client. Once those connections have been established, the clients determine which database server instance, of those database server instances to which they are connected, to send requests to based, at least in part, on advisory messages sent to the clients by the GDS framework.

26 Claims, 4 Drawing Sheets

PROVIDING SERVICES ACROSS SYSTEMS THAT MANAGE DISTRIBUTED REPLICAS

FIELD OF THE INVENTION

The present invention relates to providing services across systems that manage distributed replicas and, more specifically, to a global data service framework for managing connections to and load balancing among such systems, and to manage failover of services across these replicas.

BACKGROUND

For a variety of reasons, many businesses maintain many copies of the same data. For example, an international corporation may replicate critical data across many databases located around the world. Reasons for maintaining multiple replicas of the same data include, but are not limited to:
business continuity and disaster recovery;
performance optimization for local clients;
content localization and caching;
compliance to local laws; and
integration of datacenters obtained through mergers and acquisitions.

While maintaining several replicas of the same data may provide multiple benefits, it can also be cumbersome if not managed efficiently. Consequently, database systems have been developed which provide "database services" and which allow service-level workload management across the database server instances that belong to the same cluster grid.

Unfortunately, managing workload across the database server instances that belong to a cluster grid does not account for the potentially numerous replicas that are being maintained outside that grid. A distributed environment typically supports a greater degree of heterogeneity than a cluster. For example, within a distributed environment, the various systems across which replicas are maintained may have different hardware architectures, different operating systems, even different types of database systems. Unlike a cluster, databases in a distributed environment do not have access to shared storage for keeping state. Hence, it would be desirable to have a mechanism by which multiple distributed replicas of the same data may be efficiently managed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
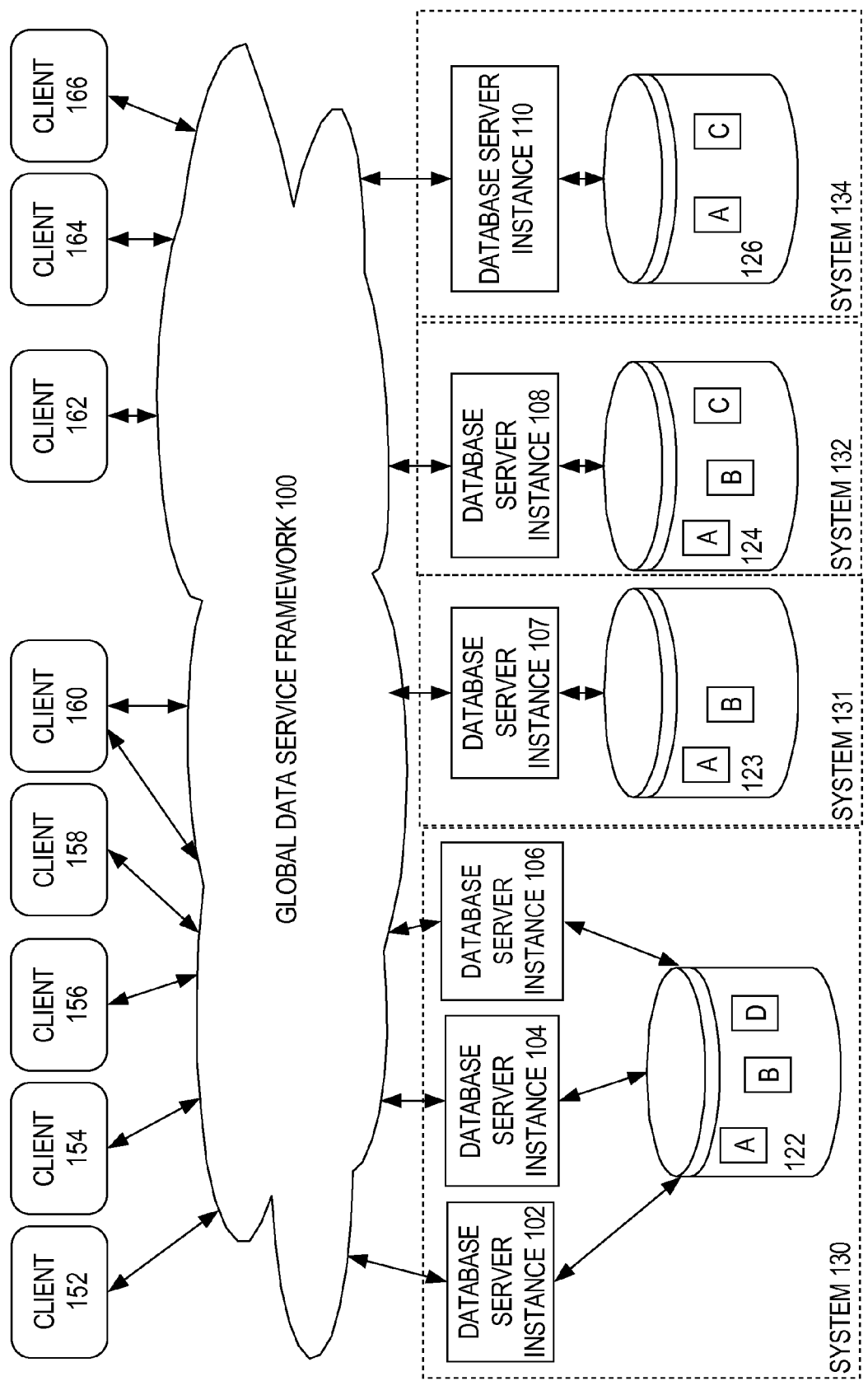
FIG. 1 is a block diagram of a distributed replication system managed by a global data service framework, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein that allow users to define a global service that is offered across multiple replicated databases. Database clients connect to and use a global service just as they do with regular services on a single database today. Upon receiving a connection request, a collection of components, referred to herein collectively as the Global Data Service framework (GDS framework), automatically chooses the best database server instances to which to connect a client. Once those connections have been established, the clients determine which database server instance, of those database server instances to which they are connected, to send requests to based, at least in part, on advisory messages sent to the clients by the GDS framework.

According to one embodiment, the GDS framework generates the load/performance information based on information pushed from the databases themselves. This is different from external boxes that must look at the externally-measurable behavior. Thus, instead of clients trying to infer what they should do by looking at the external behavior of the databases, the databases tell the client what they should do via the GDS framework. Consequently, the GDS can be more proactive and predictive. For example, the GSM may advise clients to move work away from a database if the database is about to reach overload, about to start a huge batch job, or if the database is about to undergo a planned shutdown.

In one implementation, the GDS framework provides a single, central tool to add, remove, modify and relocate global services and view their status on particular instances. The tool can also be used for configuring GDS framework and managing its components.

Significantly, the GDS framework may be implemented using heterogeneous database environments. For example, the set of databases used by the GDS framework (collectively referred to herein as the "database cloud") may include clustered databases from any number of vendors, and single instance databases from any number of vendors, linked together through any type of replication technology. Further, the GDS framework can be set up across databases running on different hardware/software platforms.

According to one embodiment, while the GSM provides the load balancing/failover functions, the GSM only gets involved during connection establishment and in telling the client the relative 'goodness' of the connections that a connection pool has. In such an embodiment, the GSM is not in the request path, so each client-server roundtrip (SQL call) does not have an extra hop.

Example Distributed Replication System

Referring to FIG. 1, it is a block diagram of a distributed replication system. Specifically, FIG. 1 illustrates a database cloud that includes four database systems 130, 131, 132, and 134. Database system 130 is a clustered database system in which multiple database instances 102, 104 and 106 access the same shared storage 122. On the other hand, database systems 131, 133 and 134 are single-instance database systems that include database server instances 107, 108, and 110, respectively. Database server instance 107 manages data on storage 123. Database server instance 108 manages data on storage 124. Database server instance 110 manages data on storage 126.

In the illustrated embodiment, various sets of data are replicated among the database systems 130. Specifically, replicas of a data set A are managed by all four systems 130, 131, 132 and 134. Replicas of a data set B are managed by systems 130, 131 and 132. Replicas of a data set C are managed by systems 132 and 134. Finally, a data set D is managed exclusively by system 130.

Because database server instances 102, 104 and 106 belong to the same cluster, all database service instances 102, 104 and 106 can directly access the replicas of data sets A, B and D that are stored on storage 122. However, the database server instances 102, 104, and 106 cannot directly access the data managed by database server instances 107, 108 and 110, since database server instances 107, 108 and 110 do not belong to the cluster of system 130. Similarly, database server instance 107 can only directly access the replicas in systems 131. Database server instance 108 can only directly access the replicas in systems 132. Database server instance 110 can only directly the replicas in system 134.

In the illustrated embodiment, five clients 152, 154, 156, 158 and 160 are associated with system 130. Client 160 is also associated with system 131, illustrating that there need not be a one-to-one relationship between clients and systems. System 132 is associated with one client 162, and system 134 is associated with two clients 164 and 166. As shall be described in greater detail hereafter, rather than issue connection requests directly to a database server instance within a system with which they are associated, the clients are configured to issue connection requests to a global data service framework 100. The GDS framework 100, in turn, determines with which database server instances, within which system, to connect each client.

In addition, GDS framework 100 sends advisory messages to the clients to indicate to the clients to which database server instances the client should submit requests for any given global service. For example, in one embodiment, the GDS framework 100 sends advisory messages that contain a set of percentages specifying the proportion of requests, for a particular global service, to be sent to particular database server instances. Such advisory messages may be generated at regular time intervals and/or in response to instance load changes that require client requests to be redistributed appropriately. Over time, those percentages for a given service may change, based on a variety of factors such as the workload each system is currently experiencing. In response to such changes, the GDS framework 100 will change which database server instance(s) and/or percentages that is/are recommended for the service in the advisory messages sent to the client.

Significantly, systems 130, 131, 132 and 134 may be at the same location, at different locations near each other, distributed across the country, or distributed across the world. The techniques described herein work with any system in which replicas of a data set are distributed among different database systems, regardless of the geographic proximity of those database systems to each other. However, as shall be described in greater detail below, the location of each database system may be a factor by which the global data service framework 100 determines which database server instance should service any given request.

Global Service Managers And Regions

Figure 2:
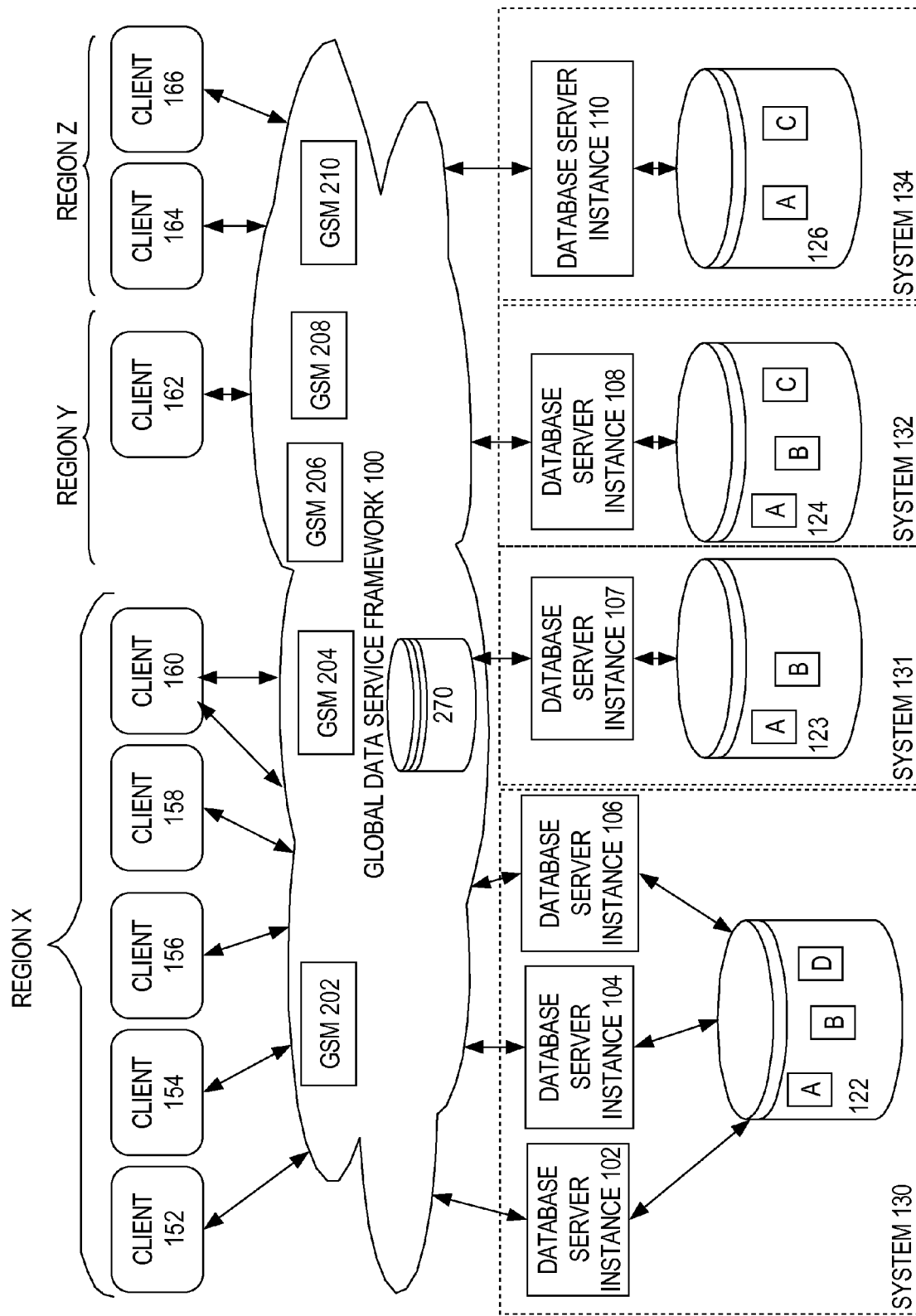
FIG. 2 is a block diagram of the distributed replication system of FIG. 1, where the various database systems are divided into regions, according to an embodiment of the invention.

In one embodiment, the global services framework 100 is implemented by a set of global service managers (GSMs), as illustrated in FIG. 2. One or more of the global service managers are available to each database system managed by the global services framework 100. Logically, the global service managers are separate from the database server systems with which they interact. Thus, global service managers may be executed on the same machine as the database server instances, or may be executed on different machines than the machines that are executing the database server instances with which the global service managers interact.

According to one embodiment, global service managers are grouped into regions. Each region may include one or more global service managers, and be associated with one or more of the database systems with which the global service framework 100 interacts. For the purpose of illustration, it shall be assumed that global service managers 202 and 204 belong to a region X, which includes database systems 130 and 131. Global service managers 206 and 208 belong to a region Y, which includes database system 132, and global service manager 210 belongs to a region Z which includes system 134.

In this example, region X is associated with two database systems, and regions Y and Z are each associated with a single database system. However, as mentioned above, each region may be associated with any number of database systems. In one embodiment, database systems are associated with the same region when the database servers have some form affinity to each other. For example, database systems may be associated with the same region when they are geographically close to each other, or when they are connected to each other via a high speed interconnect. Preferably, the database systems that are grouped together in each region are those that have similar latencies from the perspective of the clients in the region to which the database systems are assigned. Thus, systems 130 and 131 have similar latencies from the perspective of clients 152 to 160.

The global service manager that resides in the same region as a given client is referred to as a "local global service manager" relative to that client. For example, referring to FIG. 2, global service managers 202 and 204 reside in region X, and are therefore local to clients 152, 154, 156, 158 and 160 and database server instances 102, 104, 106 and 107. Global service managers 206 and 208 reside in region Y, and are local to client 162 and database server instance 108. Global service manager 210 resides in region Z and is local to clients 164 and 166 and database server instance 110.

Each global service manager, acts as a regional listener that is used by clients to connect to global services. According to one embodiment, client connection requests are randomly distributed among all regional GSMs. Each GMS also measures the network latency and bandwidth between its own region and all other regions and exchanges this information with GSMs in other regions.

As shall be described in greater detail hereafter, each GSM performs connection load balancing by directing a client connection to the most appropriate database instance. The instance is determined based on metrics that the GSM receives from all instances, estimated network latency/bandwidth and region affinity of the service.

According to another aspect, each GSM manages cardinality and failover of global services by starting, stopping and moving them between instances and databases. GSMs may also send advisory messages to clients, to recommend the degree to which the clients should use each connection in a connection pool to obtain a particular service.

According to one embodiment, each GSM also monitors databases instances, generates and publishes events when an instance, database or network go down. GSM also generates and publishes events for clients in the local region according to performance metrics it receives from all instances in the cloud and integrating them with estimated network latency. When all GSMs in a region are down, GSMs from the buddy region take over generation of events for the region. Buddy regions shall be described in greater detail hereafter.

Database Pools

In one implementation, databases included in a database cloud can be grouped into database pools. A database pool is a set of databases within a database cloud that provides a unique set of global services and belongs to a certain administrative domain, e.g. HR Pool, Sales pool. A database can only belong to a single database pool. It is not necessary that all databases in a pool provide the same set of global services; an individual database can support only a subset of services provided by the pool. However, all databases that provide the same global service must belong to the same pool. A database pool can have a dedicated set of administrators that can only administer this pool. Therefore database pools simplify administration and improve security in large database clouds.

The Global Data Service Catalog

According to one embodiment, a global data service catalog (GDS catalog) is another component of the global data service framework 100. The GDS catalog is a repository of information maintained by the GDS framework 100. The information stored in the GDS catalog may include, for example, the configuration and the run-time status of the database cloud. More specifically, the information maintained in the GDS catalog may include data on global services, the attributes of each of the global services, and all logical and physical components of the cloud: database pools, regions, global service managers, and database instances. The catalog may also contain data on replication and network topologies related to the cloud.

Examples of the information items that may be maintained within the GDS catalog include, but are not limited to:
where the databases within the database cloud are organized into "database pools", the members of each database pool
which databases are enabled for each global service
which databases are preferred for each global service
the "cardinality" specified for each global service How the various pieces of information that are stored in the GDS catalog are used by the service framework 100 shall be described in greater detail hereafter.

In one embodiment, there is a single GDS catalog for each database cloud. However, multiple replicas of the catalog may be maintained for high-availability purposes. In FIG. 2, the GDS catalog is illustrated as stored in a GDS catalog database 270. However, the GDS catalog may be stored in any type of repository, including a flat file. Further, while GDS catalog database 270 is depicted as a single storage device, GDS catalog database 270 may be stored on several storage devices, each of which may store all or a distributed portion of the GDS catalog.

Handling Connection Requests

As mentioned above, when the global service framework 100 receives a connection request from a client, the global services framework 100 selects which database server instances the client should be connected to, and facilitates the connection of the client to the selected database server instances.

According to one embodiment, clients communicate their connection requests to the global services framework 100 by sending their connection requests to one of their local global service managers. For example, a request from client 152 to establish a connection may be sent to global service manager 202 or 204, both of which are local to client 152. A connection request from client 162 may be sent to global service manager 206 or 208. Similarly, a connection request from client 164 may be sent to global service manager 210.

Under some circumstances, a client may send a connection request to a global service manager of a region with which the client is not associated. This situation may occur, for example, if none of the local global service managers are available for some reason, such as all the databases in the local region are down. For example, if global service managers 202 and 204 of region X are both down, client 152 may send its connection requests to global service manager 206 of region Y, even though global service manager 206 is not local to client 152. Note that this reconnect can be done automatically by client middleware; so each application does not need to implement this logic.

The global service manager that receives the connection request then selects the database server instance(s) with which to connect the client that sent the request. For the purpose of illustration, it shall be assumed that client 154 sends a connection request to global service manager 202. In response, global service manager 202 may cause a connection to be formed between client 154 and database server instance 102. According to one embodiment, global service managers are only involved in establishing connections. In such an embodiment, once the connections are established, clients talk directly to the database systems to which they have been connected.

In the example given above, a single connection is established in response to the connection request of client 154. However, in many systems, clients establish client-side connection pools that may include connections to many database server instances. Further, a client's connection pool may also include multiple connections to the same database server instance. Thus, the connection request from client 154 may request the establishment of five connections, and in response to the request the global service manager 202 may establish two connections between client 154 and database server instance 102, one connection between client 154 and database server instance 104, one connection between client 154 and database server instance 108, and one connection between client 154 and database server instance 110.

Buddy Regions

According to one embodiment, each region has a designated "buddy region". In general, the buddy region of a particular region is a region whose GSMs will take over responsibilities of the particular region if the particular region's GSMs are prevented from handling the responsibilities.

For example, when all GSMs in a region are down, one or more of the GSMs in the buddy region start acting as listeners for the region with failed GSMs. Thus, if GSMs 202 and 204 of region X go down, and region Y is the buddy region of region X, then one of GSMs 206 and 208 from region Y may start acting as the listener for region X, while it continues to act as a listener for region Y. Under these circumstances, if client 156 from region X issues a connection request, the connection request will be handled by one of the GSMs 206 and 208 from region Y.

Significantly, using a GSM in a certain region to establish a database connection does not mean that the database to which the GSM chooses to establish the connection will be in the same region as GSM. Any GSM can forward a connection request to any database that provides the appropriate service. Thus, even though GSMs 202 and 204 are down, GSM 206 (which resides in region Y) may cause client 156 to be connected to database server instance 107 (which resides in region X).

The GSMs of buddy region Y may assume all responsibilities normally handled by the GSM's of region X, not merely the responsibility of listening for connection requests. For example, one or more of the GSMs of buddy region Y may also take over the responsibility for generating events for region X. As another example, in addition to generating metrics for local clients, a GSM may also need to calculate metrics for the region for which it is designated as the buddy, and publish them for clients residing that region. This may be necessary, for example, when all GSMs in that region are down.

Registration

According to one embodiment, both global services, and the database instances that are available to run the global services, register with the GDS framework. Specifically, with respect to the global services, the registration information specifies a set of attributes associated with each global service. The attributes control when and where the services are started, how and if connections to them are load balanced, how and if the connections are failed over, and more. According to one embodiment, the attributes that are registered for a service specify, among other things:
Run time load balancing goal
Connection time load balancing goal
Role-based services
Connection fail-over properties
Preferred/available databases
Replication lag
Region affinity With respect to database instance registration, when a database joins the database cloud, or re-starts after a shutdown, the database registers with all GSMs in the cloud. The GSM that receives the registration responds by querying the GDS Catalog to determine which services can be started on the database that is being registered. Those services are then started on the database server instance, and database server instance thereby becomes a candidate for connections with clients that require those global services.

Factors for Selecting where to Establish Connections

As explained above, global service managers are responsible for selecting which connections to establish in response to a connection request from a client. According to one embodiment, the global service managers make such selections based on a variety of factors in order to efficiently balance the connection loads among the database server instances that are available to the global data service framework 100. Those factors may include, for example:
which database server instances are able to provide services required by the requestor
which database server instances have been designated as the "preferred" instances for the services required by the requestor
performance metrics of the database server instances
the region to which the requesting client belongs
the region to which the database server instances belongs
latency between regions
region affinity of the requested global service Each of these factors shall be described in greater detail hereafter. However, these factors are merely examples of the factors that the global data service framework 100 may take into account in selecting with which database server instances to connect a given client. The specific factors, and the weights given to each, may vary from implementation to implementation.

Region Affinity

According to one embodiment, each global service may have a stronger "affinity" to some regions than to other regions. Specifically, in one embodiment, each global service has two parameters: 'locality' and 'region_failover', which allow the user to specify a degree of service affinity to a region. Depending on the value of these parameters, various policies may be supported. For example, a default region affinity policy may be in effect when the locality parameter is set to "anywhere" (default). In this case, a client connection request is routed to the best database that can satisfy the load balancing goal for the requested service. The choice of the database is based on its performance and network latency between the regions where the client and database reside. The target database can be chosen from any region. If databases in different regions are equally loaded, this policy gives preference to a local region, i.e. a client gets connected to a database that belongs to the same region. An inter-region connection is made only if the difference in database performance between regions overweighs network latency.

If there are preferred/available databases specified for a service which locality parameter is set to "anywhere", service cardinality is maintained at the database pool level. This means that, if a service goes down on a preferred database, it will be started on an available database and the number of service providers in the pool will remain the same. When starting the service on an available database the preference is given to a database in the region where the service went down. If there is no available database for this service in the local region, an available database is chosen randomly from a nearby region.

When the locality parameter is set to "local_only", a client connection request is routed to the best database in the client's region that can satisfy the load balancing goal for the requested service. The choice of the database is based only on its performance. A "local region only" service can be provided in multiple regions at the same time, but a client from one region never gets connected to a database in another region.

If there are preferred/available databases specified for a service which locality parameter is set to "local_only", service cardinality is maintained at the regional level. This means that, if a service goes down on a preferred database, it will be started on an available database in the same region, so the number of service providers in the region will remain the same. If there is no available database for this service in the local region, no action is taken and the service cardinality decreases. If there is no database in the local region offering the service, a client connection request is denied. This basically means that, if a service has affinity to local region, database cardinality of the service is maintained independently in each region.

An "affinity to local region with inter-region failover" policy is in effect when the locality parameter is set to "local_only" and the 'region_failover' option is specified. The policy is the same as "local_only" with the only difference that, if there are no databases in the local region offering a service, instead of denying a client request, it is forwarded to the best database (in terms of load and network latency) in another region that has the requested service started. Such service failover does not cause the service to be started on an available database in another region. The reason for not starting the service is that, with affinity to local region, database cardinality is maintained per region and should not change as a result of service failure in another region. If regional databases become overloaded because of inter-region failover, then a database administrator (DBA) can manually add a preferred database for the service.

Database Server Instance Performance Metrics

With respect to performance metrics, in one embodiment, each of the database server instances periodically reports its performance metrics to the global data services framework 100. In one embodiment, each database server periodically sends its performance metrics to each global service manager in the GDS framework 100. In an alternative embodiment, each database server instance reports its performance metrics initially to a local global service manager, and each global service manager may communicate its locally-obtained performance information to global service managers in other systems. In the latter embodiment, database server instance 110 may periodically report its performance information to global service manager 210, which is local to database server instance 110. In turn, global service manager 210 may communicate the performance information from database server instance 110 to global service managers in each of systems 130 and 132.

The performance information received from the database server instances is an example of one type of information that the global data services framework 100 may maintain within GDS catalog database 270. In one embodiment, each global service manager receives, stores, and maintains its own separate copy of the performance metrics of all database server instances managed by the GDS framework 100.

Because the performance metrics are reported by the database server instances, the metrics are likely to be more accurate than if performance of the database server instances where simply monitored from an external source. Further, with the database server instances reporting their metrics, the GDS framework 100 need not incur the additional overhead associated with such externally performed monitoring operations. Nevertheless, the techniques described herein are also applicable to systems in which performance information is acquired by performing external monitoring of the database server instances that belong to the database cloud.

The specific performance metrics reported by each database server instance may vary from implementation to implementation, and the techniques described herein are not limited to any particular set of performance metrics. As an example, the performance metrics may include, but are not limited to:
number and type of CPUs
current CPU utilization
memory size and current consumption
I/O bandwidth to the storage system and the current I/O load According to one embodiment, the above-listed metrics are collected per database instance. The following metrics are collected both per database instance and also per each service running on an instance:
average response time for a database request
average number of database requests executed per second
average number of parallel database sessions
average time a database request spends waiting for busy resources
average time a database request spends waiting for locks, latches Inter-Region Latency As mentioned above, inter-region latency may be one of the factors used to determine with which databases a client should be connected. In one embodiment, the latency values upon which this determination is based are estimates of the network round-trip time between the global service managers in two regions. These estimations, in turn, may be based on round-trip data collected from multiple messages over some time period.

For example, each of the global service managers may monitor the latency incurred by communications with the global service managers in other regions. Thus, the latency incurred by a message sent by global service manager 210 to global service manager 202 may serve as an indication of the latency between the regions (X and Z) that correspond to systems 130 and 134. Similarly, the latencies incurred by messages from global service manager 206 to global service managers 204 and 210 respectively indicate the latencies between the region Y of system 132 and the regions (X and Z) of systems 130 and 134.

Required Data Sets

In the situation where not all data sets are replicated at all systems, the data set to which a client requires access is an important factor in determining which database server instances to connect the client with. The global data service framework 100 may obtain information about the data sets to which a client requires access in any of a variety of ways. For example, configuration data of the client may indicate the data set(s) to which the client requires access. As another example, the connection request sent by a client may include metadata that indicates the data sets to which the client requires access. According to one embodiment, clients use different service names to identify different data sets.

For the purpose of illustration, assume that each of data sets A, B, C and D corresponds to a different range of data items within a distributed database. Under these circumstances, a request issued by client 154 may indicate the range of the data items to which client 154 requires access. Based on the range information specified in the request, the ranges associated with the data sets, and the mapping between the data sets and the systems, the global data service framework 100 is able to determine which database server instances have access to the data required by client 154. As shall be explained in detail hereafter, any database server instance that does not have access to the data required by client 154 may be disqualified as a connection candidate for client 154.

Connection Candidate Selection

Figure 3:
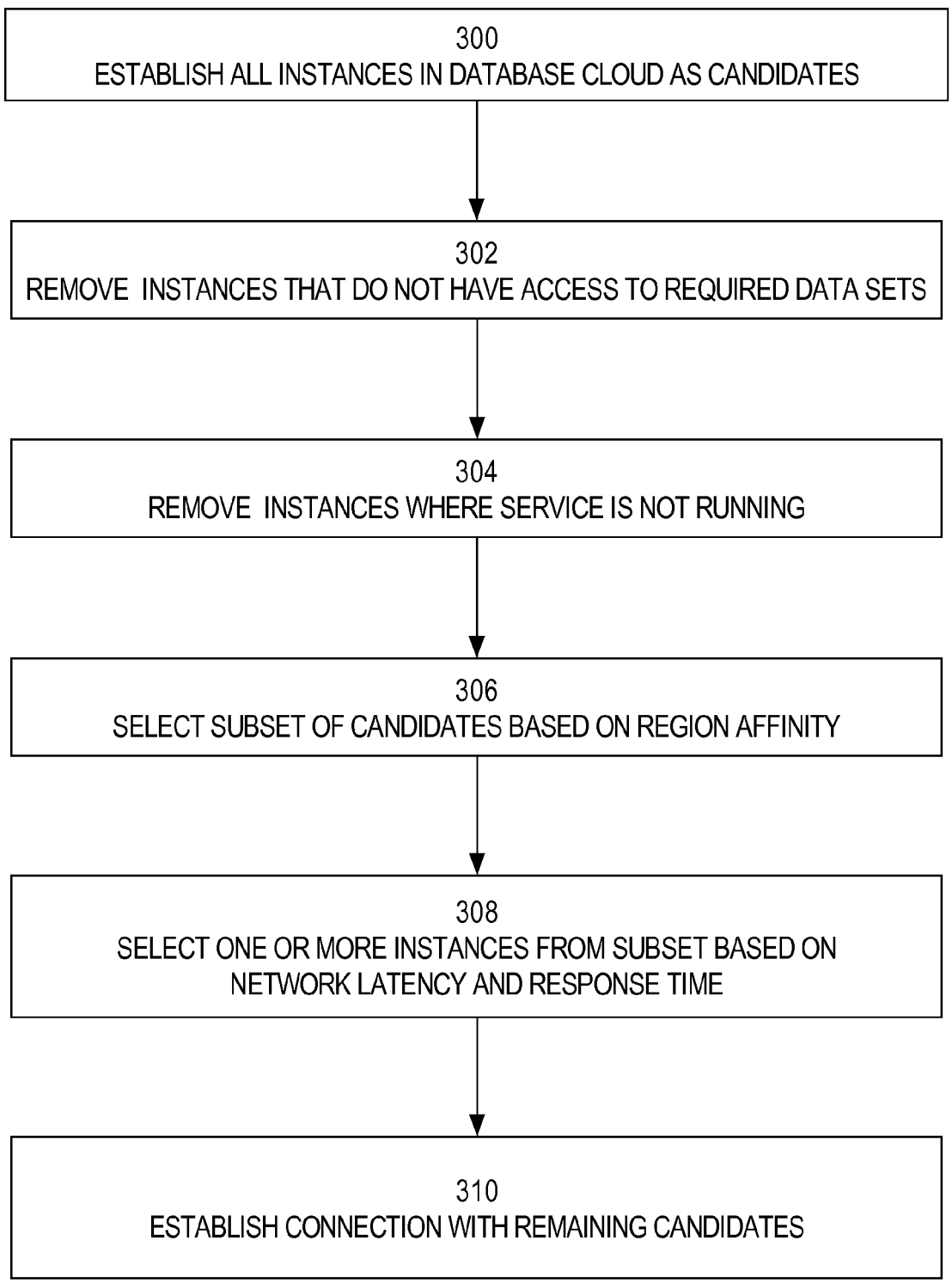
FIG. 3 is a flowchart illustrating how to respond to a connection request, according to an embodiment of the invention.

Referring to FIG. 3, it illustrates how the global data service framework 100 responds to a request from a client to establish a pool of connections, according to one embodiment. In step 300, all database server instances are initially established as connection candidates. At step 302, the global data service framework 100 removes from the set of connection candidates those database server instances that do not have access to the data sets used by the client that submitted the request.

For the purposes of illustration, it shall be assumed that client 154 issued the request, and that client 154 requires access only to data set A. Since all of systems 130, 132 and 134 have replicas of data set A, no database server instances are removed from the set of connection candidates during step 302. However, if client 154 required access to data set B, then database server instance 110 would be removed from the set of connection candidates, because database server instance 110 belongs to a system 134 that does not have a replica of data set B.

At step 304, instances that have access to the required data set, but which are not running the required service, are removed from the connection candidate set. An instance can have the service down, for example, because the instance is not "preferred" and the desired service cardinality is reached, because the replication lag exceeds the maximum acceptable value, or because of a failure or planned maintenance.

At step 306, a subset of candidates is selected based on region affinity. For example, if the locality parameter of the requested service is set to "local_only", then step 306 involves selecting only those remaining candidates that are in the same region as the client that is requesting the service. On the other hand, if the locality parameter of the service is set to "anywhere", then step 306 may select all remaining candidates, regardless of the region to which they belong.

At step 308, one or more instances from the subset are selected based on network latency and the database response time. For example, in one embodiment, if (network latency+ response time) for a database in a remote region is less than the database response time in the local region, then the database instance in the remote region is chosen.

At step 310, connections are established between the client and the remaining candidates.

The selection logic illustrated in FIG. 3 is merely an example of how various factors may be accounted for in the decision of which database server instances, from all instances available in the database cloud, a client connects to in response to a connection request. The actual logic used, and factors accounted for, may vary from implementation to implementation. For example, in an alternative embodiment, step 308 is skipped and an equal number of connections are established to each database instance in the subset selected in step 306.

Runtime Load Balancing

Using the techniques described above, the global data service framework 100 may intelligently balance the connection loads among the various database server instances available in a distributed replication system. However, even an optimal distribution of connections does not guarantee that, during runtime, some database server instances will be overloaded while other are underutilized.

For example, assume that after an optimal distribution of connections has been established, all clients 152-156 include, within their respective connection pools, a connection to database server instance 102. If all clients use their respective connection to database server instance 102 for most or all of their database requests, database server instance 102 will become overworked while the remaining database server instances 104, 106, 108 and 110 go underutilized.

Thus, according to one embodiment, in addition to connection load balancing, the GDS framework supports balancing of work requests at run time in situations where a connection pool connects a client to multiple database server instances that provide the same global service. In one embodiment, the choice of a connection for a unit of work is made by client-side connection pools and is based on service metrics that show relative performance of database instances for a service. The GDS framework provides clients with such metrics for all instances across multiple databases. In one embodiment, when calculating metrics, the GDS framework takes into account instance load, run-time balancing goals (service time, throughput), network latency, and all other factors described above upon which connection-time load balancing is based.

Run time load balancing improves performance by minimizing response time, or maximizing throughput for a given service by spreading the service workload as needed across local and remote database instances that are available to offer the service. Intelligent load balancing algorithms guarantee that the framework gracefully reacts to changes in workload and availability of resources.

In one embodiment, to facilitate runtime load balancing, the global data service framework 100 sends advisory messages to the clients. For example, in one embodiment, global service manager 202 periodically communicates to client 152 which database server instance, of the database server instances in the connection pool of client 152, is currently the database server instance to whom client 152 should send work requests.

The appropriate database server instance for any given client may vary over time based on a variety of factors. For example, assume that the connection pool of client 152 includes database server instances 102, 108 and 110. At time T1, if none of the database server instances are particularly busy, global service manager 202 may indicate to client 152 that database server instance 102 should be used because database server instance 102 is local to client 152. However, at time T2, global service manager 202 may indicate to client 152 that database server instance 108 should be used. This change in recommendation may occur, for example, if database server instance 102 is overloaded at time T2.

The global service managers may be configured to send database service instance advisory messages to the clients at fixed intervals, or in response to changes within the system. In an embodiment where advisory messages are sent in response to changes, the changes that trigger the sending of advisory message may include, for example, significant changes in the load on any given database server instance, the removal or addition of a database server instance, the generation of an error by one or more of the database server instances, an increase or decrease in latency between regions, etc.

The advisory messages need not merely identify a single database server instance for a given service. For example, an advisory message to a client may indicate the percentage of that client's work that should be sent to each of a plurality of database server instances. Thus, an advisory message sent from global service manager 202 to client 152 may indicate that client 152 should send 50% of its work to database server instance 102, 35% of its work to database server instance 108, and 15% of its work to database server instance 110. The recommendation given in such advisory messages remain in effect at a client until the client receives a new advisory message. The new advisory message may specify different set of percentages and/or a different set of database server instances. For example, the next advisory message to client 152 may indicate that client 152 should send 10% of its work to database server instance 102, 85% of its work to database server instance 108, and 5% of its work to database server instance 110.

To achieve load balancing goals, the runtime load balancing techniques described herein may be used in conjunction with another mechanism, referred to as "connection gravitation". Connection gravitation moves connections at runtime from instances which have too many connections for the current workload to instances that do not have enough connections. Connection gravitation may be implemented in the client code, and is described in U.S. patent application Ser. No. 12/938,545, filed Nov. 2, 2010, the entire contents of which are incorporated herein.

"Preferred" and "Available" Instances

According to one embodiment, a user can specify "preferred" and "available" databases for a global service. Normally, the global service is provided by the database server instances that have been designated as "preferred" for that global service. If one of the preferred databases fails to provide the service, the service is automatically relocated to one of the database server instances that was identified as "available" for that global service.

Therefore, GDS framework maintains service cardinality (number of databases offering a service) according to the number of preferred databases specified. A singleton global service is a special case of global service cardinality, when there is only one preferred database for the service at any time. Support for the singleton service is especially important in case of active/active databases to guarantee that only the current 'master' copy of data can be modified.

When preferred database instances have been specified for a global service, the GDS framework 100 attempts to ensure that a service always runs on all preferred databases that have been specified for the global service. Therefore the number of preferred databases is referred to as the database cardinality of a service. At least one preferred database has to be specified for a service.

When adding or modifying a service, the user can also specify a list of available databases for this service. If one of the preferred databases fails to provide a global service, the GDS framework 100 relocates the service to one of the available databases to maintain the desired database cardinality for the service. If a failed service was running on a single database and there is no available database for this service, GDS framework 100 alerts the administrator that the service cannot be provided.

Specifically, if, after a preferred database failure, the number of available databases is insufficient to maintain database cardinality for a service, the actual service cardinality will fall below the number of preferred databases. Also, when the GDS framework 100 cannot be notified about a failure of a global service on one or more databases, e.g. because of a network outage, it is assumed that the service is still running on those databases. Therefore, specifying N preferred databases for a service only guarantees that the service will never run on more than N databases, but it can sometimes run on less than N databases.

In one embodiment, when an "available" database for a particular global service fails, the global service is relocated to another "available" database for that global service. In an alternative embodiment, a service may be relocated from an available database back to a preferred database.

In a system that uses role-based services, a role-based service can be started on a database only if the database is listed as preferred or available for the service AND the database's role (whether it is a primary or standby) corresponds to the role specified for the service. For example, a service that can run on any database in a configuration as long as it is a primary should be specified with the role 'primary' and have all databases in the configuration as preferred. When specifying preferred/available databases under these circumstances, potential side effects of role transitions on service cardinality should be considered.

Global Singleton Service

A global singleton service is a service that is offered on only one database of a database pool at a time, i.e. a global service which database cardinality is equal to 1. A singleton service guarantees that only a master (primary) data replica can be updated and, by doing so, prevent data corruptions caused by updating multiple replicas at the same time.

In a configuration that uses role-based services, only the primary database can be updated, and there is at most one primary at any time. Therefore the singleton property is implicitly provided for any service with the role attribute set to 'primary' no matter how many preferred or available databases are specified for the service.

In multi-master environments, users may partition mastership of their data across multiple databases. In this case, updates must go to the primary site for their chunk of the data. To support this functionality, a separate update service should be created for each chunk of data and only one preferred database specified for each service.

Policies for Selecting Instances to Recommend During Runtime

To perform runtime load balancing, a connection request is directed to the best instance in the distributed database system that is currently providing the services required by the requesting client. In one embodiment, the instance is chosen based on its load, load balancing goal, and network latency between the client and server. A degree of affinity to local servers should be respected.

As mentioned above, a client request for a global service is directed to a database server in close geographic proximity with the client, unless all local servers are overloaded and a remote server can provide significantly better quality of service. However, in some cases, for example, to take advantage of data caching on a local server, the user might want to always direct requests to local servers. According to one embodiment, the GDS framework supports various types of client-server affinity that can be specified as a service attribute.

Handling Replication Lag

For performance reasons, distributed database systems often use asynchronous replication of data between databases. This means that there is a possibility of a delay in between the time an update is committed to data on a primary database and the time this update appears on a replica. In other words, a replica can have stale data because the updates committed to the replica can be lagging behind the updates committed to the master database.

According to one embodiment, the GDS framework 100 allows applications to differentiate between global services that provide real time data from services that can return stale data because of replication lag. For applications that can tolerate a certain degree of lag, the GDS framework 100 allows the user to set a maximum acceptable lag value in seconds. In one embodiment, tolerance for replication lag is specified using the global service parameter—lag.

If lag is not acceptable, requests for such service will be forwarded only to a primary database or its replica that is synchronized with the primary. If lag is acceptable and a maximum is specified, then a service request is forwarded to a database that does not lag the primary by a longer time than the specified value. If a database falls behind the primary by a longer time interval than the setting permits, the service is disabled and clients connected to it are notified. In this case, new client connections are routed to a database that satisfies the lag requirement for the service.

For applications that cannot tolerate any replication lag, global services should be configured with the 'lag' parameter set to 0. Requests for such service will be forwarded only to a primary (master) database, or to its replica that is synchronized with the primary.

For many applications it is acceptable to read stale data as long as it is consistent. Such applications can use global services running on any database replica no matter how big the replication lag is. A global service that can return data with unlimited staleness should be configured with the 'lag' parameter set to "ANY". In case of a database failure, such service can be moved to any other database where it is enabled. "ANY" is the default value for the parameter.

If the lag parameter for a service is set to a any numerical value, a client request can be forwarded only to a database that is not lagging the primary replica by a longer time that the parameter value. If there is no such database, the connection request will fail.

According to one embodiment, to support global services with the lag parameter, each GSM periodically receives lag values from databases and generates a 'service member down' event if the lag on a particular database exceeds the value specified for a service. The event will force clients of the service to disconnect from the database. New requests for the service will be routed to a database that satisfies the specified lag value.

In an alternative embodiment, lag values are not sent to the GSM. Instead, each database server monitors lag values for its services, and shuts down any service it is running service when the maximum lag for the service is exceeded. The service may be brought back up by the database server when the lag value is within the acceptable range for the service.

In case of a database failure, a client connection might be routed to another database that satisfies the maximum lag value specified for the service, but lags behind the first database. Such "going back in time" can create data consistency problems for some applications. This problem may be handled in a variety of ways, such as informing the client of the situation.

According to one embodiment, the "going back in time" problem is avoided by having the requesting client tell GSM what its current time is. Based on this information, the GSM can ensure that the database that is selected for the failover provides data that is sufficiently current to satisfy the application's requirements.

Handling Failures

According to one embodiment, if a database fails to provide a service, a client request is forwarded to another database that offers this service. Depending on service cardinality and failover policy, a database failure can also cause starting the service on another database.

Because the GDS framework provides disaster recovery and business continuity in case of failures, the framework itself is highly available. Thus, mechanisms are provided to allow the GDS framework to continue to work (although possibly in a degraded mode) in case of a single failure of any framework component, network partitioning and even a complete site failure. For high availability and performance reasons, data about parameters and status of global services and GDS framework components is replicated in multiple repositories. When network partitioning and/or failure of a database or GDSF component causes data discrepancies across repositories, an automatic cross-check is triggered that verifies and potentially restores mutual consistency of data stored in different components of the system.

According to one embodiment, in case of a service or database failure, a service that was running on the database fails over to another database where it is enabled, but not running yet (assuming that the database role matches the service role). "Preferred" databases are considered for the failover target before "available" databases. After a service has been moved from one database instance to another, the GDS framework 100 may send advisory messages to all clients to indicate that future requests for that service should go to the newly designated server. Those advisory messages may be sent immediately in response to the failover of the service, or in the next periodic advisory message that is sent after the failover.

According to one embodiment, when a service moves to an available database, the GDS framework 100 does not move the service back when the preferred database restarts. If necessary, a user can always manually relocate the service back to the preferred database after is has restarted. This can be done gracefully without termination of active sessions.

As mentioned above, a service cannot failover from a database in one region to a database in another region when the locality parameter is set to LOCAL_ONLY and the inter-region failover is not enabled.

According to one embodiment, all global service managers monitor service availability on all databases in the database cloud. When a service cannot be provided anymore because of a failure, the first GSM that notices it and connects to the catalog database will try to start the service on an available database. If the service failover cannot be done because there is no available database offering this service, the GSM creates an alert in the catalog database about the inability to maintain the specified cardinality of the service. The alert can trigger an automatic notification sent to the pool administrator.

A GSM cannot perform an automatic service failover if it is unable to connect to the cloud catalog. In this case the GSM can create an alert on a cloud database to which it is able to connect.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
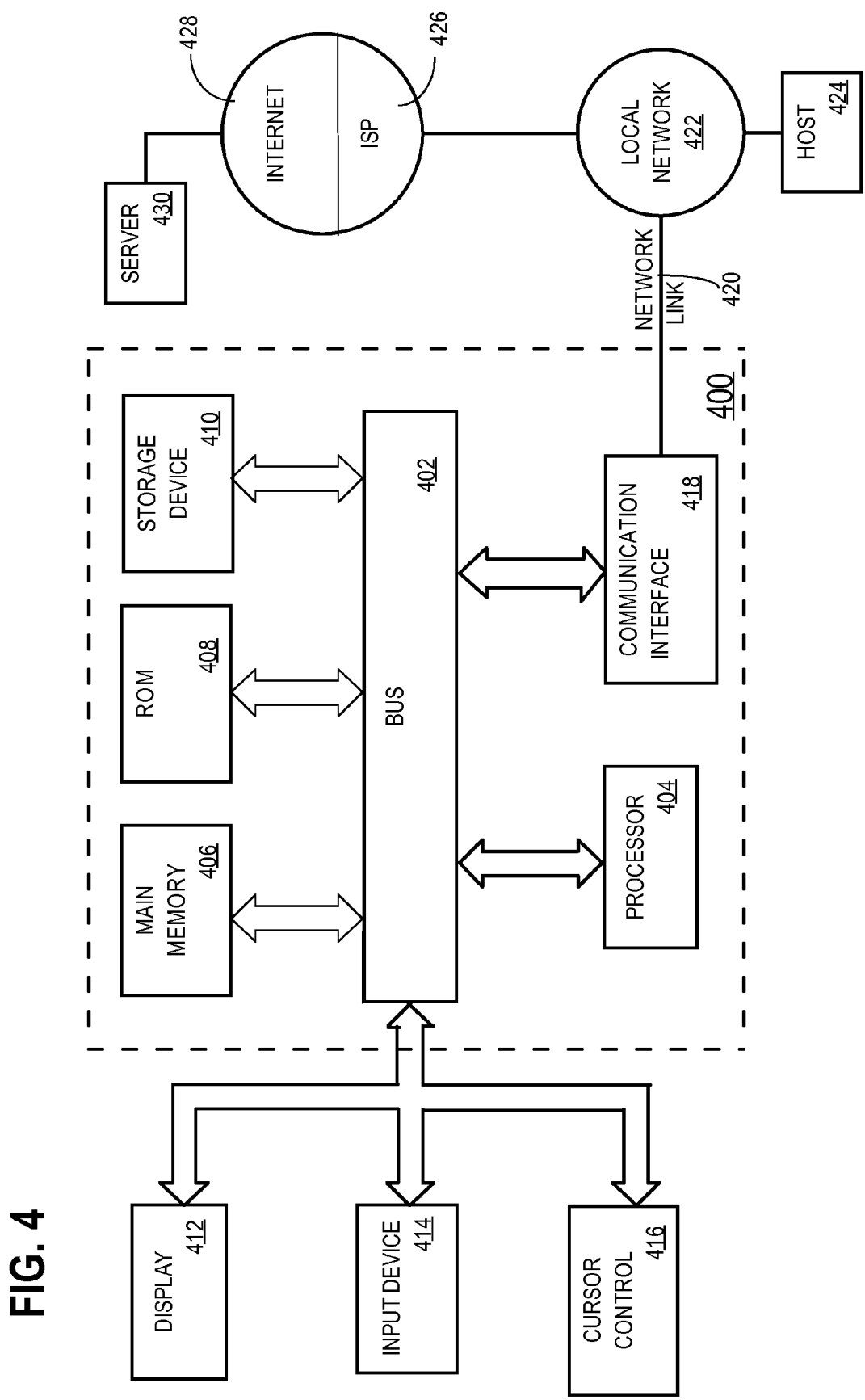
FIG. 4 is a block diagram of a computer system upon which embodiments of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving a connection request from a client that requires access to a data set stored in a distributed replication environment;
wherein the distributed replication environment includes a plurality of database systems, each of which maintains a separate copy of the data set to which the client requires access;
wherein each of the plurality of database systems includes one or more database server instances;
in response to the connection request, performing the steps of:
selecting at least one database server instance, from among a set of database server instances that includes at least one database server instance from each of the plurality of database systems, based on one or more selection criteria;
wherein every database server instance in the set of database server instances has access to a copy of the data set to which the client requires access; and
facilitating establishment of one or more connections between the client and the at least one database server instance;
wherein the method is performed by one or more computing devices.

2. The method of claim 1 wherein the set of database server instances that includes at least one database server instance from each of the plurality of database systems do not have direct access to the copies of the data set that reside at the others of the plurality of database systems.

3. The method of claim 1 wherein the plurality of database systems is organized into regions, and the one or more selection criteria include latency of communication between the regions.

4. The method of claim 3 wherein the at least one database server instance includes a particular database server instance that is in a region that is different than the region that is local to the client.

5. The method of claim 1 wherein the one or more selection criteria include that the at least one database server instance is designated as a preferred database server for a service required by the client.

6. The method of claim 1 wherein the one or more selection criteria include performance metrics reported by the database server instances that belong to the plurality of database systems.

7. The method of claim 1 wherein the one or more selection criteria include that the at least one database server belongs to the same database system with which the client is associated.

8. The method of claim 1 wherein the at least one database server instance is selected based, at least in part, on anticipated changes in performance or availability of at least one of the plurality of database systems.

9. A method comprising:
selecting at least one database server instance, from a plurality of database server instances that have access to a data set required by a particular service, to recommend to a particular client for the particular service;
wherein every database server instance in the plurality of database server instances has access to a copy of the data set to which the particular service requires access;
communicating to the particular client an advisory message that recommends the at least one database server instance for work requests associated with the particular service;
wherein each of a plurality of database systems maintains a separate copy of the data set;
wherein the plurality of database server instances includes at least one database server instance from each of the plurality of database systems;
wherein the method is performed by one or more computing devices.

10. The method of claim 9 wherein the plurality database server instances do not have direct access to the copies of the data set that reside at the others of the plurality of database systems.

11. The method of claim 9 wherein the advisory message is sent in response to a change in one or more of the plurality of database systems.

12. The method of claim 9 wherein the advisory message is sent in response to a certain interval of time having elapsed since the sending of a previous advisory message.

13. The method of claim 9 wherein the advisory message recommends two or more database server instances for work requests associated with the particular service.

14. The method of claim 9 wherein:
the particular client is associated with a first database system of the plurality of database systems; and
selecting at least one database server instance includes selecting a second database server instance that belongs to a second database system, of the plurality of database systems, that is different than the first database system.

15. The method of claim 14 wherein the at least one database server instance also includes a first database server instance that belongs to the first database system.

16. The method of claim 9 wherein the at least one database server instance is selected based, at least in part, on latency of communication between the plurality of database systems.

17. The method of claim 9 wherein the at least one database server instance is selected based, at least in part, on whether the at least one database server instance is designated as a preferred database server instance for the particular service.

18. The method of claim 9 wherein the at least one database server instance is selected based, at least in part, on performance metrics reported by the database server instances that belong to the plurality of database systems.

19. The method of claim 9 wherein the at least one database server instance is selected based, at least in part, on whether the at least one database server belongs to the same database system with which the particular client is associated.

20. The method of claim 9 further comprising:
detecting that the particular service is no longer available from a database server instance that was providing the particular service;
in response to detecting that the particular service is no longer available from the database server instance that was providing the particular service, performing the steps of:
selecting a second database server instance, of the plurality of database server instances, to provide the particular service;
wherein the second database server instance is selected based, at least in part, on the second database server instance being identified as a database server instance that is available to provide the particular service.

21. The method of claim 9 wherein the at least one database server instance is selected based, at least in part, on whether changes made to the copy of the data set accessed by the at least one database server instance lag behind changes made to another copy of the data set by more than a specified threshold amount of time.

22. The method of claim 9 wherein the at least one database server instance is selected based, at least in part, on anticipated changes in performance or availability of at least one of the plurality of database systems.

23. One or more non-transitory storage media storing instructions which, when executed by one or more computing devices, cause performance of a method comprising:
   receiving a connection request from a client that requires access to a data set stored in a distributed replication environment;
   wherein the distributed replication environment includes a plurality of database systems, each of which maintains a separate copy of the data set to which the client requires access;
   wherein each of the plurality of database systems includes one or more database server instances;
   in response to the connection request, performing the steps of:
      selecting at least one database server instance, from among a set of database server instances that includes at least one database server instance from each of the plurality of database systems, based on one or more selection criteria;
      wherein every database server instance in the set of database server instances has access to a copy of the data set to which the client requires access; and
      facilitating establishment of one or more connections between the client and the at least one database server instance.

24. One or more non-transitory storage media storing instructions which, when executed by one or more computing devices, cause performance of a method comprising:
   selecting at least one database server instance, from a plurality of database server instances that have access to a data set required by a particular service, to recommend to a particular client for the particular service;
   communicating to the particular client an advisory message that recommends the at least one database server instance for work requests associated with the particular service;
   wherein each of a plurality of database systems maintains a separate copy of the data set;
   wherein the plurality of database server instances includes at least one database server instance from each of the plurality of database systems.

25. A system comprising:
   a plurality of database systems, including a first database system and a second database system;
   wherein each of the plurality of database systems maintains a separate copy of a data set used by a service;
   a plurality of database server instances including at least one database server instance from each of the plurality of database systems;
   a global data service framework configured to establish connections between clients that belong to the plurality of database systems and the plurality of database server instances, wherein the global data service framework is configured to establish connections between clients that belong to the first database system and a database server instance that belongs to the second database system when certain criteria are satisfied;
   wherein the global data service framework is configured to send to clients of the plurality of database systems advisory messages that indicate from which database server instances, of the plurality of database server instances, the clients should request particular services.

26. The system of claim 25 wherein recommendations contained in the advisory messages are based, at least in part, on performance metrics sent by the plurality of database server instances to the global data service framework.

* * * * *

UNITED STATES PATENT AND TRADEMARK OFFICE
CERTIFICATE OF CORRECTION

| | | |
|---|---|---|
| PATENT NO. | : 8,838,535 B2 | Page 1 of 1 |
| APPLICATION NO. | : 13/645819 | |
| DATED | : September 16, 2014 | |
| INVENTOR(S) | : Hu et al. | |

It is certified that error appears in the above-identified patent and that said Letters Patent is hereby corrected as shown below:

In The Specification

In column 15, line 20, after "to" delete "a".

In The Claims

In column 20, line 12, in Claim 10, after "plurality" insert -- of --.

Signed and Sealed this
Seventeenth Day of March, 2015

Michelle K. Lee
*Director of the United States Patent and Trademark Office*